April 16, 1929.  C. C. WHITTAKER  1,709,643

TEMPERATURE INDICATOR FOR MOTORS

Filed June 11, 1927

INVENTOR
Charles C. Whittaker
BY
ATTORNEY

Patented Apr. 16, 1929.

1,709,643

UNITED STATES PATENT OFFICE.

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA.

TEMPERATURE INDICATOR FOR MOTORS.

Application filed June 11, 1927. Serial No. 198,135.

My invention relates to temperature-indicating devices and particularly to such devices in which the temperature indicated or measured is a function of the change in resistance of an electrical conductor.

An object of my invention is to provide a temperature-indicating device that shall be responsive to the average temperature of all of the end turns of the coils comprising the stator winding of a dynamo-electric machine.

A further object of my invention is to provide a thermal element for a temperature-indicating device that shall be simple in construction and easily manufactured, and;

A still further object of my invention is to provide a thermal element for an electro-responsive device that shall provide an efficient low-resistance path for the flow of heat from a body to the thermal element with which it may be in contact.

In practicing my invention, I provide a temperature-indicating device for such apparatus as dynamo-electric machines that comprises, in general, a Wheatstone bridge that is provided with an electro-responsive indicating instrument which is responsive to an unbalance of the bridge.

The bridge consists of well-known resistance elements connected in parallel circuit with each other, with the exception that one of the resistance elements consists of a conductor having a plurality of return-bend convolutions.

The resistance element is placed within a sheath of absorbent material that may be impregnated with a viscous substance for uniting the respective convolutions of the resistance elements and the sheath into a compact homogeneous structure. The resistance element so constructed is then placed around the end turns of the stator winding of the dynamo-electric machine and fastened in position by suitable securing means and a viscous adhesive material, whereby an efficient heat path is provided from the stator coils to the resistance element.

The resistance element, being so placed, may then be connected in the Wheatstone-bridge circuit, as previously stated herein.

For a fuller understanding of my invention, reference may be had to the following specification, taken in conjunction with the accompanying drawing, in which Figure 1 is an expanded view illustrating a conductor having a plurality of return-bent convolutions and a device for determining the length of the convolutions;

Figure 1:

In Fig. 1 of the drawings, a base 10 is illustrated that is provided with spaced-apart pins 11 and 12, the distance between which is to be determined by the particular use to which it is put. A conductor 13 is wound back and forth around the pins 11 and 12, whereby a conductor having a plurality of return-bent convolutions 14 is provided. In order that the respective convolutions shall be insulated from each other, the conductor 13 may either be enameled with insulating material or cotton covered. As shown, the convolutions or turns may be of such number that both ends of the conductor terminate at one end, i. e., at the pin 12, so that the conductor may be non-inductive, if so desired.

In order to hold the respective convolutions 14 together tightly and compactly, a string 15 may be inserted through each of the loops at the ends of the various convolutions. The strings may then be drawn up as tightly as desired and tied in a convenient knot at 16.

When the length of the conductor 13 has been properly determined, so that the resistance thereof is a fixed value at some base or reference temperature, the conductor 13 is inserted within an open-end sheath 17. In a specific embodiment of my invention, the sheath 17 may be of such material as cotton cloth, woven in the form or shape of the ordinary flat shoe lace.

Figure 2:
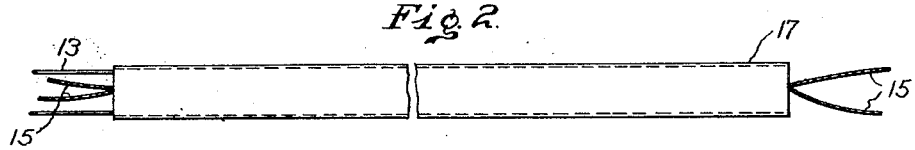
Fig. 2 is an enlarged top plan view of a thermal element embodying my invention.

The assembly illustrated in Fig. 2 may be impregnated with such viscous adhesive materials or fluids as shellac or similar materials that possess electric insulating properties in addition to the properties which enable it to stick to a body with which it may be placed in contact.

Figure 3:
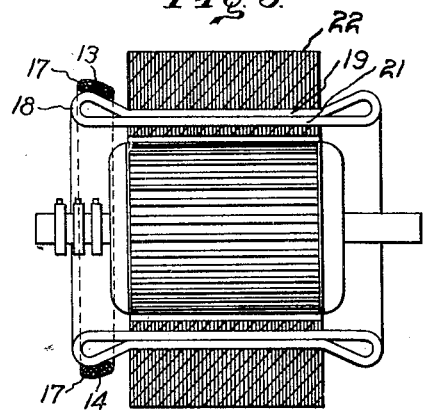
Fig. 3 is a view, in vertical section, of a dynamo-electric machine, to the stator of which is secured the thermal element illustrated in Fig. 2.

A thermal element so constructed may be placed in position around the end turns 18 of a stator winding of a dynamo-electric machine (see Fig. 3). The end turns 18 may be designated as the ends of the coils which constitute the stator winding, sides 19 and 21 of the coils being secured within the usual slots provided in a laminated magnetic iron structure 22.

When the sheath 17 containing the conductor 13 has been placed as shown in Fig. 3, the strings 15 are tied together in order to secure the sheath in position. With the sheath in this position, it may be impregnated thoroughly with shellac in order that a good bond may be effected between the surface of the ends of the coils and the surface of the sheath. When this is done, an efficient heat path is provided between the stator coils and the conductor 13.

Figure 4:
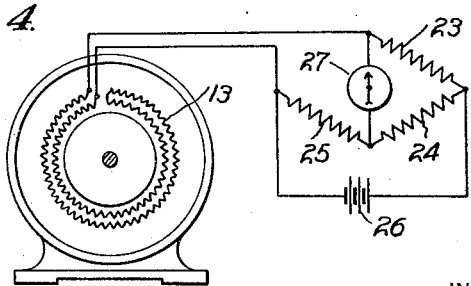
Fig. 4 is a schematic illustration of circuits and apparatus embodying my invention.

When the thermal element illustrated in Fig. 1 to 3 has been fixed in position on the dynamo-electric machine, the ends of the conductor 13 may be connected in a Wheatstone bridge circuit as shown in Fig. 4. As there illustrated, the Wheatstone bridge comprises resistance elements 23, 24, 25 and the conductor 13. The bridge may be energized from a source of E. M. F. 26 that is connected to one end of the conductor 13 and to the common junction between the resistance elements 23 and 24.

An indicating electro-responsive instrument 27 has one terminal thereof connected to the other end of the resistance element or conductor 13 and the other terminal thereof to the common junction between the resistance elements 24 and 25. If the temperature of the conductor 13 increases, the resistance thereof increases also, thus causing an unbalance in the Wheatstone bridge which produces a deflection in the instrument 27 that is proportional to the change in temperature of the resistance element 13 from a fixed or base temperature.

The resistance elements 23, 24 and 25 may be of such material as manganin, which is a material that has a substantially zero temperature coefficient of resistance. The resistance element 13 may be of a material such as copper that has a relatively high temperature coefficient of resistance.

It is preferred that the structure 13 be wound non-inductively, in order that any variations in current in the stator coils of the dynamo-electric machine may not effect the indications of the instrument 27.

Since the end turns of the coils of a dynamo-electric machine protrude outwardly from the laminated magnetic iron structure 22, the means for dissipating the heat generated in the ends of the coils, caused by the I²R loss incident to current flow therein, are not so efficient as in the portions of the coils which are in direct thermal relation with the magnetic structure 22. The heat generated in the portions of the coils which are in direct contact with the laminated iron structure 22 is conducted into the iron. Since the iron structure has a large thermal capacity, the portion of the coils in contact therewith will not be heated to a very high temperature until the iron structure itself has been heated to a relatively high temperature. Since the ends of the coils are not in direct thermal conductive relation with the iron structure and because the cooling of the end turns is effected chiefly by air currents passing thereover, the ends are usually heated to a relatively high temperature.

Therefore, as the thermal element comprising the conductor 13 and the sheath 17 is wound around the end turns of the stator coils, an average of the hot spots obtaining in the armature coils is available to vary the resistance of the conductor 13 substantially in accordance with the temperature of the coils. Since the change in resistance is a function of the temperature thereof, any increase in temperature of the conductor 13 will cause an increasing deflection or indication to take place in the instrument 27 whereby a relatively accurate temperature indication of the armature of a dynamo-electric machine may be obtained.

By my invention, I have provided a thermal element for a Wheatstone bridge circuit that comprises a structure having a plurality of return-bent convolutions that are disposed within an absorbent sheath, which sheath may be impregnated with an insulating, heat conducting viscous fluid so that, when the element is placed or attached to a body whose temperature is to be ascertained, an efficient heat path may be effected from the heated body to the thermal element. The thermal element is simple in construction, and easily fabricated and placed in position.

Various modifications may be made in the device embodying my invention without departing from the scope and the spirit thereof. I desire, therefore, that only such limitations shall be placed thereon as are imposed by the prior art and the appended claims.

I claim as my invention:

1. In combination, a stator winding, and a temperature-indicating device therefor, said device comprising a source of electromotive force, an electro-responsive indicating device and a Wheatstone bridge, said bridge being electrically connected to said source of electromotive force and said indicating device, a portion of said bridge having a temperature coefficient of resistance and being wound around the periphery of one end of said stator winding and secured to said portion of the stator winding by means of a binder, whereby an average of temperature indication of an entire end portion of the stator winding may be obtained.

2. In combination, a stator winding, and a temperature-indicating device therefor comprising a source of electromotive force, an electro-responsive indicating device and a Wheatstone bridge electrically connected to said source of electromotive force and said indicating device, a portion of said bridge having a temperature coefficient of resistance and being wound non-inductively around the periphery of one end of said winding in thermal relation therewith and secured thereto by means of a binder, whereby an average temperature of the entire end portion of the winding may be obtained.

3. In combination, a coil structure and a temperature-indicating device for the coil structure, comprising a source of electromotive force, an electro-responsive indicating device and a Wheatstone bridge electrically connected at predetermined points to said source of electromotive force and said indicating device, a portion of said bridge having a temperature coefficient of resistance and being secured to a predetermined portion of said coil structure along the periphery thereof.

4. In combination, a coil winding, and a temperature-indicating device therefor comprising a source of electromotive force, an electro-responsive indicating device and a Wheatstone bridge electrically connected to said source of electromotive force and said indicating device, a portion of said bridge having a temperature coefficient of resistance and being non-inductively wound and secured to a portion of said coil winding along the periphery thereof.

5. In combination, a stator winding, and a temperature-indicating device therefor, said device comprising a source of electromotive force, an electro-responsive device, and a Wheatstone bridge electrically connected at predetermined points to said electro-responsive device and said source of electromotive force, said bridge comprising a plurality of electrically-connected resistance arms, one of said arms comprising a return-bent loop conductor having a temperature coefficient of resistance, said loop conductor being secured to an end portion of said stator winding along the periphery thereof.

6. In combination, a stator winding, and a temperature-indicating device therefor, said device comprising a source of electromotive force, an electro-responsive device, and a Wheatstone bridge electrically connected at predetermined points thereof to said electro-responsive device and said source of electromotive force, said bridge comprising a plurality of electrically-connected resistance arms, one of said arms comprising a return-bent loop conductor having a temperature coefficient of resistance and said loop conductor being secured to an end portion of said stator winding along the periphery thereof, and means for providing a thermally conductive heat path from said winding to the loop conductor.

7. In combination, an electromagnetic winding, and a temperature-indicating device therefor, said device comprising a source of electromotive force, an electro-responsive device, and a Wheatstone bridge electrically connected at predetermined points to said electro-responsive device and said source of electromotive force, said bridge comprising a plurality of electrically-connected resistance arms, one of said arms comprising a return-bent loop conductor having a temperature coefficient of resistance, said loop conductor being secured to an end portion of said electromagnetic winding along the periphery thereof, said loop conductor being disposed along the periphery of one end of said winding, and means for securing said loop conductor thereto and for providing a highly conductive path for the flow of heat from said winding to the said loop conductor.

In testimony whereof, I have hereunto subscribed my name this 7th day of June, 1927.

CHARLES C. WHITTAKER.